US010343434B2

(12) United States Patent
Maruhashi

(10) Patent No.: US 10,343,434 B2
(45) Date of Patent: Jul. 9, 2019

(54) IMAGE FORMING APPARATUS

(71) Applicant: KYOCERA Document Solutions Inc., Osaka (JP)

(72) Inventor: Ken Maruhashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/753,854

(22) PCT Filed: Oct. 12, 2016

(86) PCT No.: PCT/JP2016/080212
§ 371 (c)(1),
(2) Date: Feb. 20, 2018

(87) PCT Pub. No.: WO2017/098801
PCT Pub. Date: Jun. 15, 2017

(65) Prior Publication Data
US 2019/0009593 A1   Jan. 10, 2019

(30) Foreign Application Priority Data
Dec. 11, 2015   (JP) .................................. 2015-241813

(51) Int. Cl.
*G06F 1/26* (2006.01)
*B41J 29/38* (2006.01)
(Continued)

(52) U.S. Cl.
CPC .............. *B41J 29/38* (2013.01); *G03G 21/00* (2013.01); *G03G 21/14* (2013.01); *G06F 1/26* (2013.01);
(Continued)

(58) Field of Classification Search
CPC .......... H04N 1/00885; H04N 1/00888; H04N 1/00896; H04N 1/00904; H04N 1/00095;
(Continued)

(56) References Cited

U.S. PATENT DOCUMENTS 5,446,904 A * 8/1995 Belt .......................... G06F 1/24
713/323
2011/0115567 A1* 5/2011 Sutardja .................... G06F 1/08
331/34

(Continued)

FOREIGN PATENT DOCUMENTS

JP     2006-94045 A     4/2006

*Primary Examiner* — Chad Dickerson
(74) *Attorney, Agent, or Firm* — Stein IP, LLC

(57) ABSTRACT

An image forming apparatus includes a function control processing unit, a clock oscillation unit, power supply control unit including a power supply control processing unit which starts as a power supply of the image forming apparatus is turned on to control energization of constituent elements and control a startup operation of the function control processing unit. Further, the image forming apparatus has a warming-up operation mode in which when the power supply of the image forming apparatus is turned on, the power supply control processing unit starts up to make the clock oscillation unit start operating to transmit a clock signal to the function control processing unit, and in which the power supply control processing unit restarts itself and starts up the function control processing unit after a lapse of a predetermined standby time set beforehand, with the function control processing unit kept inactive.

4 Claims, 6 Drawing Sheets

(51) Int. Cl.
   *H04N 1/00* (2006.01)
   *G03G 21/00* (2006.01)
   *G03G 21/14* (2006.01)

(52) U.S. Cl.
   CPC ............ *H04N 1/00* (2013.01); *H04N 1/00095* (2013.01); *H04N 2201/0094* (2013.01)

(58) Field of Classification Search
   CPC ..... H04N 2201/0094; G06F 1/26; G06F 1/28; G06F 1/3243; G06F 1/3293; G03G 21/14; G03G 21/00; B41J 29/38
   USPC ........ 358/1.11–1.18; 713/323, 324, 330, 340
   See application file for complete search history.

(56) References Cited

U.S. PATENT DOCUMENTS

2014/0071477 A1\* 3/2014 Akazawa ........... H04N 1/00891
   358/1.14
2015/0125174 A1\* 5/2015 Yamaguchi ........ G03G 15/5004
   399/88

\* cited by examiner

IMAGE FORMING APPARATUS

CROSS-REFERENCE TO RELATED APPLICATIONS

This application is a national stage of International Application No. PCT/JP2016/080212, filed Oct. 12, 2016, which claims the benefit of priority to Japanese Application No. 2015-241813, filed Dec. 11, 2015, in the Japanese Patent Office, the disclosures of which are incorporated herein in their entireties by reference.

TECHNICAL FIELD

The present invention relates to image forming apparatuses, a representative example of which is a copier.

BACKGROUND ART

Some of image forming apparatuses, such as a copier, a facsimile, a printer, and a multifunction peripheral equipped with functions of these apparatuses, are equipped with a function of restarting when a glitch that prevents proper operation is caused. An example of such image forming apparatuses is disclosed in Patent Literature 1 listed below.

The conventional image forming apparatus described in Patent Literature 1 includes detection means for detecting a glitch, restarting means for executing restarting when a glitch is detected, and a restart inhibiting means for inhibiting restarting when a particular kind of glitch is detected. In this image forming apparatus, power to the apparatus is shut down in the case of the particular kind of glitch to inhibit restarting of the apparatus. Thereby, restarting is executed only where no existing glitch is fatal, and this helps improve the reliability and safety of the image forming apparatus.

CITATION LIST

Patent Documents

Patent Literature 1: Japanese Patent Application Publication No. 2006-94045

SUMMARY OF INVENTION

Technical Problem

However, the conventional image forming apparatus described in Patent Literature 1 is disadvantageous in that the apparatus itself does not include any provision for malfunction caused, in particular, in a main control unit which executes processing related to various functions, or in an integrated circuit (function control processing unit), such as an application specific integrated circuit (ASIC), when a start-up environment temperature, which is an environment temperature at the time of starting up of the apparatus, is lower than a recommended operation temperature. For example, it is desirable for the function control processing unit to be used under a predetermined recommended operation temperature set beforehand. There has been a concern that, if the image forming apparatus, specifically, the function control processing unit, is made to operate under an environment with a temperature that is not the recommended operation temperature, a malfunction may be caused to prevent a proper operation of the apparatus.

The present invention has been made in view of the above problem, and an object of the present invention is to provide an image forming apparatus that is capable of preventing malfunction attributable to a start-up environment temperature that is lower than a recommended operation temperature, and thus is capable of improving reliability and safety.

Solution to Problem

To solve the above problem, an image forming apparatus according to the present invention includes a function control processing unit, a clock oscillation unit, a power supply control unit, and a power supply control processing unit. The function control processing unit controls operations of constituent elements provided in the image forming apparatus and executes processing related to a function of the image forming apparatus. The clock oscillation unit transmits a clock signal to the constituent elements of the image forming apparatus including the function control processing unit. The power supply control unit supplies power to the constituent elements. The power supply control processing unit is provided in the power supply control unit, starts up when power supply to the image forming apparatus is turned on, controls energization of the constituent elements, and controls an operation of the function control processing unit at a time of startup. Here, the power supply control processing unit has a warming-up operation mode in which when the power supply to the image forming apparatus is turned on, the power supply control processing unit starts up to make the clock oscillation unit start operating to transmit the clock signal to the function control processing unit, and after a lapse of a predetermined standby time set beforehand, with the function control processing unit kept inactive, the power supply control processing unit restarts itself and starts up the function control processing unit.

Advantageous Effects of Invention

According to a configuration of the present invention, a clock oscillation unit is made to operate when power supply to the image forming apparatus is turned on, and transmission of a clock signal to a function control processing unit is started. The clock oscillation unit continues the transmission of the clock signal to the function control processing unit during a predetermined standby time, during which the function control processing unit is kept inactive. Thereby, the function control processing unit continuously receives the clock signal, which causes the temperature of the function control processing unit itself to rise. This makes it possible to prevent malfunction of the image forming apparatus that would otherwise be caused under a start-up environment temperature that is lower than a recommended operation temperature.

DESCRIPTION OF EMBODIMENTS

Embodiments of the present invention will be described below with reference to the accompanying drawings. It should be understood that the present disclosure is not limited to what is specifically mentioned below.

Figure 1:
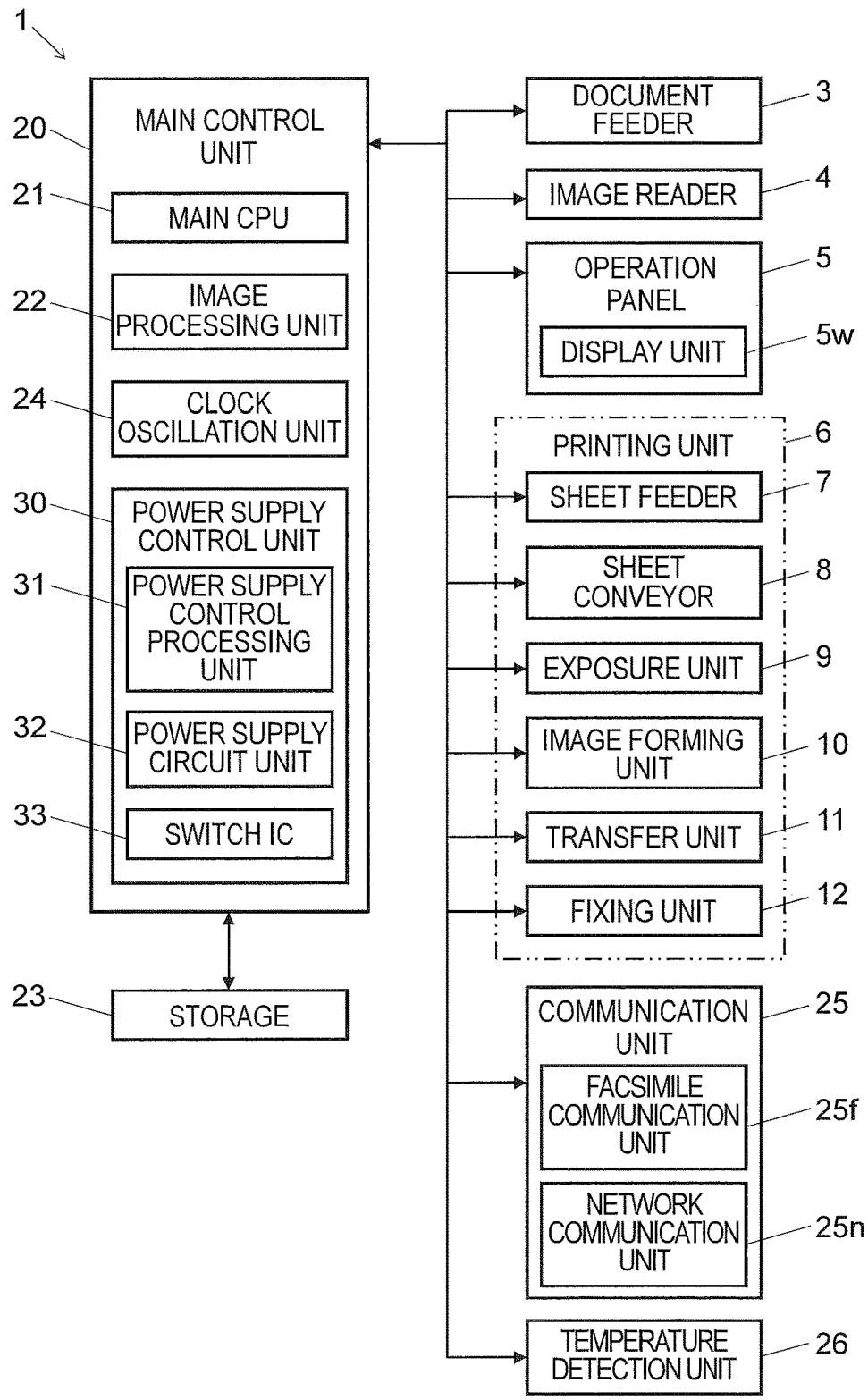
FIG. 1 is a block diagram showing a configuration of an image forming apparatus according to a first embodiment of the present invention.

First Embodiment: First, as to an image forming apparatus according to a first embodiment of the present invention, a configuration thereof will be described with reference to FIG. 1. FIG. 1 is a block diagram showing the configuration of the image forming apparatus. This image forming apparatus is what is called a multifunction peripheral provided with a plurality of functions, such as copying (printing), scanning (image-reading), and facsimile-transmitting functions.

As shown in FIG. 1, the image forming apparatus 1 is provided with a main control unit 20. The main control unit 20 includes a main CPU 21, which is a function control processing unit, an image processing unit 22, which performs image processing on image data used for printing, transmission, or the like, and other unillustrated electronic circuits and constituent elements. The main CPU 21 executes processing related to main functions of the image forming apparatus 1 by controlling operations of constituent elements of the image forming apparatus 1 based on programs and data stored in a storage 23. The storage 23 is configured by combining a non-volatile memory such as a ROM, a flash ROM, or an HDD and a volatile memory such as a RAM.

The main control unit 20 also includes a clock oscillation unit 24, which transmits, to each of the electronic circuits in the image forming apparatus 1, including the main CPU 21 and the image processing unit 22, a clock signal functioning as a reference signal necessary for each of the electronic circuits to operate.

In an upper part of the image forming apparatus 1, a document feeder 3 and an image reader 4 are provided. When a user wants the image forming apparatus 1 to execute an image-reading job, the user puts a document carrying an image containing characters, figures, patterns, and the like on the document feeder 3, or puts such a document on an unillustrated contact glass at the top of the image reader 4. The main control unit 20 gives the document feeder 3 and the image reader 4 operation instructions for the image on the document to be read.

In an upper part of the image forming apparatus 1, on the front side of the image reader 4, an operation panel 5 is provided. The operation panel 5 includes a display unit 5w. The operation panel 5 accepts instructions that the user gives to the image forming apparatus 1 to make it execute a copying (printing) job, a scanning (image-reading) job, a facsimile-transmission job, or the like. The operation panel 5 accepts, for example, settings for printing conditions, such as what type and size of sheets to use in printing, whether to enlarge/reduce or not, and whether to perform two-sided printing or not, and also accepts input of settings such as facsimile numbers and sender names in facsimile transmission. The operation panel 5 also serves as a notification unit which notifies the user of a status of the apparatus, warnings, error messages, etc., by displaying them on the display unit 5w. The information entered on and accepted by the operation panel 5 is transmitted to the main control unit 20.

The image forming apparatus 1 is provided with, in a part thereof under the image reader 4, a printing unit 6 for executing a print job. The printing unit 6 includes a sheet feeder 7, a sheet conveyor 8, an exposure unit 9, an image forming unit 10, a transfer unit 11, and a fixing unit 12. The sheet feeder 7 holds a plurality of sheets, and feeds them out during printing. The sheet conveyor 8 conveys the sheets fed out from the sheet feeder 7, and discharges the sheets that have undergone fixing out of the apparatus. The exposure unit 9 applies laser light controlled based on image data to the image forming unit 10. With the laser light applied by the exposure unit 9, the image forming unit 10 forms an electrostatic latent image of the document image, and makes toner adhere to the electrostatic latent image to form a toner image. The transfer unit 11 transfers the toner image formed by the image forming unit 10 onto a sheet. The fixing unit 12 heats and presses the sheet having the toner image transferred thereon, and thereby fixes the toner image on the sheet. Such a printing operation of the printing unit 6 is controlled by the main control unit 20.

The image forming apparatus 1 includes a communication unit 25 for communication, such as facsimile transmission/reception and data transmission/reception, with an external communication device, a computer, or the like. The communication unit 25 includes a facsimile communication unit 25f and a network communication unit 25n. The facsimile communication unit 25f is connected to a telephone line, via which the facsimile communication unit 25f gives and receives image data and the like to and from an external communication device. The network communication unit 25n is connected to a network line, via which the network communication unit 25n gives and receives image data and the like to and from an external computer. The main control unit 20 makes the communication unit 25 execute transmission and reception of data with respect to the external communication device or the like.

The image forming apparatus 1 includes a temperature detection unit 26 for detecting a temperature inside a housing thereof. The temperature detection unit 26 is configured with, for example, a thermistor. The main control unit 20 receives, from the temperature detection unit 26, a signal indicating a temperature detected by the temperature detection unit 26.

The image forming apparatus 1 includes a power supply control unit 30 via which the image forming apparatus 1 receives operation power from an external commercial power supply or the like. The power supply control unit 30 includes a power supply control processing unit 31, a power supply circuit unit 32, and a switch IC 33. The power supply control unit 30 is connected to an external commercial power supply, for example, and uses the power supply circuit unit 32 and the like to execute rectification, voltage step-down, voltage step-up, and the like, to generate various voltages to be used in the image forming apparatus 1, and also uses the switch IC 33 and the like to supply power to each constituent element of the image forming apparatus 1.

The image forming apparatus 1 is provided with an operation mode in which the image forming apparatus 1 executes a normal image-forming or printing operation, and in addition to this operation mode, the image forming apparatus 1 is also provided with and capable of using an operation mode named warming-up operation mode, which is an operation mode for preventing malfunction attributable to a startup environment temperature that is lower than a recommended operation temperature. Switching between on and off of the warming-up operation mode can be performed via the operation panel 5.

Here, it is desirable for the main CPU 21, which is the function control processing unit of the image forming apparatus 1, to be used under an environment of a temperature above a predetermined recommended operation temperature (for example, 0° C.) set beforehand. Thus, when power supply to the image forming apparatus 1 is turned on, the power supply control processing unit 31 of the power supply control unit 30 starts up to control energization of each constituent element and to control an operation of the main CPU 21 at the time of startup. In doing so, the power supply control processing unit 31 may acquire information of the temperature inside the housing of the image forming apparatus 1 from the temperature detection unit 26, and make use of the acquired temperature information to control the operation of the main CPU 21.

To be specific about the warming-up operation mode, in the warming-up operation mode, when the power supply to the image forming apparatus 1 is turned on, the power supply control processing unit 31 starts up to make the clock oscillation unit 24 start operating to transmit the clock signal to the main CPU 21, but the power supply control processing unit 31 does not start up the main CPU 21. The clock oscillation unit 24 continues to transmit the clock signal to the main CPU 21 during a predetermined standby time during which the main CPU 21 is not started. Thereby, the main CPU 21 continuously receives the clock signal, and this causes the temperature of the main CPU 21 itself to rise. Note that the power supply control unit 30 is designed to be able to operate even under an environment of a temperature equal to or below the recommended operation temperature (for example, 0° C.) for the main CPU 21. The clock signal is, as described above, a reference signal based on which the electronic circuits included in the image forming apparatus 1 operate, and the clock signal is transmitted constantly including during operation in the warming-up operation mode.

Figure 2:
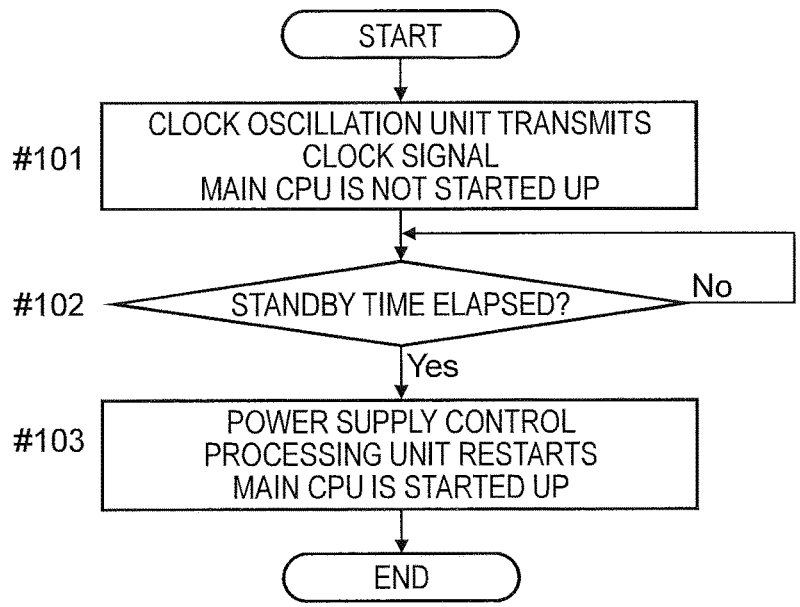
FIG. 2 is a flowchart showing an example of operation processing performed in a warming-up operation mode of an image forming apparatus according to a first embodiment of the present invention.
Figure 3:
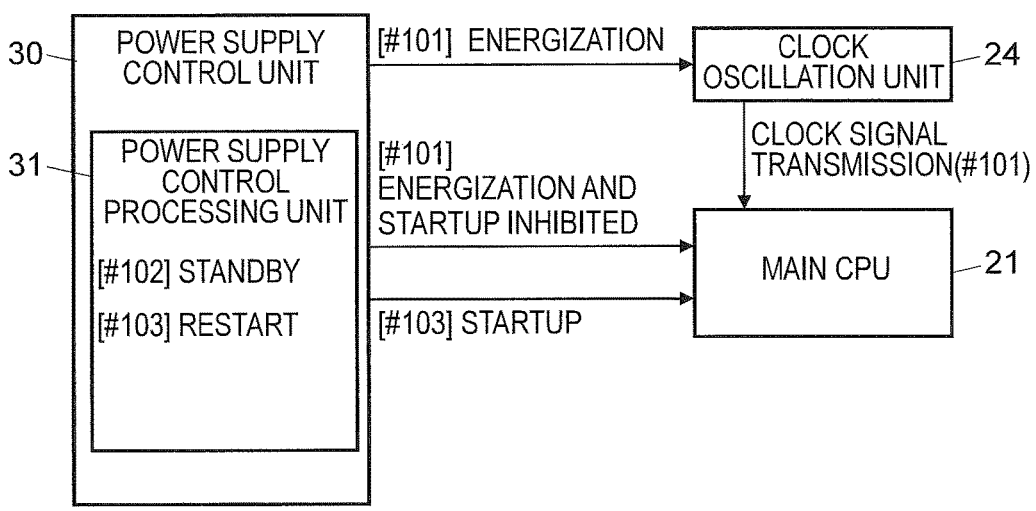
FIG. 3 is a block diagram for illustrating the operation processing performed in the warming-up operation mode of the image forming apparatus according to the first embodiment of the present invention.

A more detailed description will be given of the warming-up operation mode of the image forming apparatus 1, with reference to FIGS. 2 and 3. FIGS. 2 and 3 are respectively a flowchart showing an example of operation processing performed in the warming-up operation mode of the image forming apparatus and a block diagram for illustrating the operation processing performed in the warming-up operation mode of the image forming apparatus.

When the image forming apparatus 1 starts to operate in the warming-up operation mode (START in FIG. 2), the power supply control processing unit 31 starts up, and starts energization of each of the constituent elements at step #101, and the power supply control processing unit 31 makes the clock oscillation unit 24 start operating to transmit the clock signal to the main CPU 21, but does not start up the main CPU 21. The clock oscillation unit 24 transmits the clock signal to the constituent elements including the main CPU 21 (see FIG. 3).

At step #102, the power supply control processing unit 31 judges whether a predetermined standby time set beforehand has elapsed. This standby time is set in consideration of the time necessary for the temperature of the main CPU 21 to rise above 0° C. by continuously receiving the clock signal, and is set to a time of several to several tens of seconds. Information of this standby time is stored in the storage 23, and the length of the standby time can be changed as necessary. In a case where the standby time has not elapsed yet, the judgment at step #102 is repeatedly made until the standby time elapses. In a case where the standby time has elapsed, the process proceeds to step #103.

At step #103, the power supply control processing unit 31 restarts itself, and also starts up the main CPU 21. Then, the operation processing in the warming-up operation mode is finished (END in FIG. 2).

In this way, the temperature of the main CPU 21 itself is caused to rise by the continuous receipt of the clock signal. This helps prevent malfunction of the image forming apparatus 1 attributable to a startup environment temperature that is below the recommended operation temperature.

Figure 4:
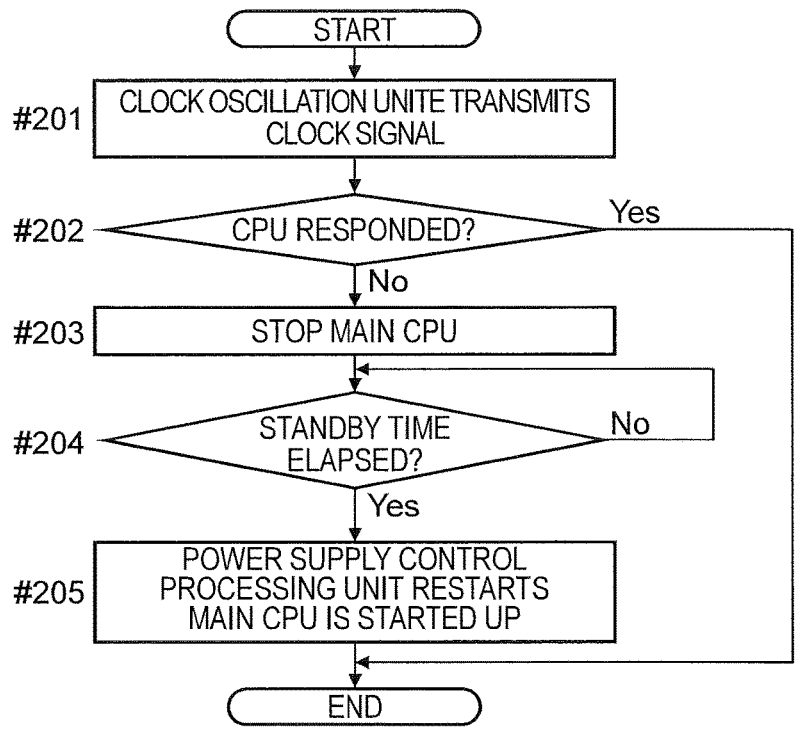
FIG. 4 is a flowchart showing an example of operation processing performed in a warming-up operation mode of an image forming apparatus according to a second embodiment of the present invention.
Figure 5:
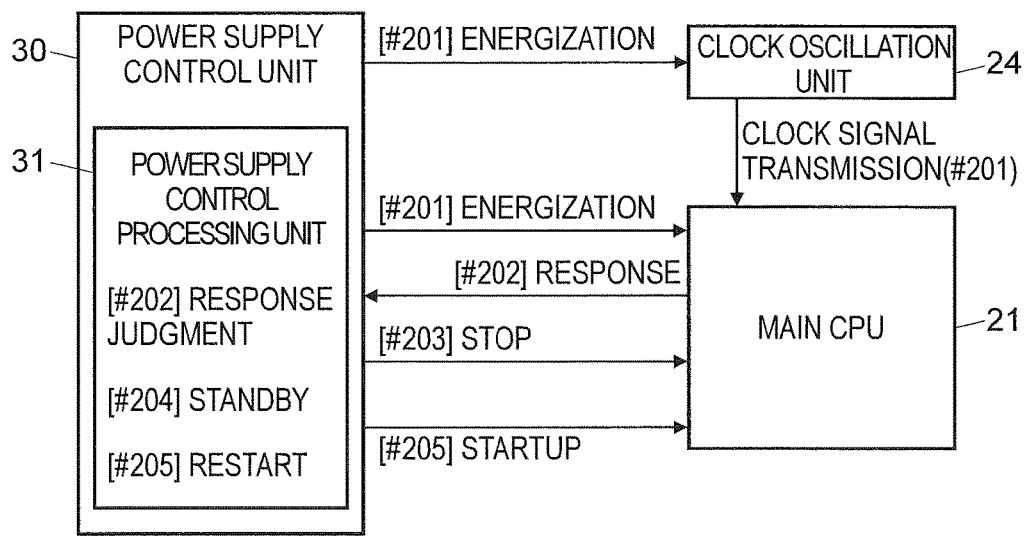
FIG. 5 is a block diagram for illustrating the operation processing performed in the warming-up operation mode of the image forming apparatus according to the second embodiment of the present invention.

Second Embodiment: Next, a description will be given of an image forming apparatus according to a second embodiment of the present invention with reference to FIGS. 4 and 5. FIGS. 4 and 5 are respectively a flowchart showing an example of operation processing performed in a warming-up operation mode of the image forming apparatus and a block diagram for illustrating the operation processing performed in the warming-up operation mode of the image forming apparatus. The configuration in this embodiment is basically the same as the configuration in the first embodiment discussed above; accordingly, such constituent elements as are found also in the first embodiment are identified by common reference signs or part names, and overlapping descriptions thereof will occasionally be omitted.

When the image forming apparatus 1 of the second embodiment starts to operate in the warming-up operation mode (START in FIG. 4), the power supply control processing unit 31 starts up to start energization of each of the constituent elements at step #201, and the power supply control processing unit 31 makes the clock oscillation unit 24 start operating to transmit a clock signal to the main CPU 21. The clock oscillation unit 24 transmits the clock signal to the constituent elements including the main CPU 21 (see FIG. 5). Here, an attempt is made to start up the main CPU 21.

At step #202, the power supply control processing unit 31 judges whether a response is being received from the main CPU 21. In a case where a response is being received from the main CPU 21, the operation processing in the warming-up operation mode is finished (END in FIG. 2), and ordinary startup processing is executed. In a case where no response is being received from the main CPU 21, the process proceeds to step #203.

At step #203, the power supply control processing unit 31 stops the main CPU 21.

At step #204, the power supply control processing unit 31 judges whether a predetermined standby time set beforehand has elapsed. In a case where the standby time has not elapsed yet, the judgment at step #204 is repeatedly made until the standby time elapses. In a case where the standby time has elapsed, the process proceeds to step #205.

At step #205, the power supply control processing unit 31 restarts itself and starts up the main CPU 21. Then, the operation processing in the warming-up operation mode is finished (END in FIG. 4).

Figure 6:
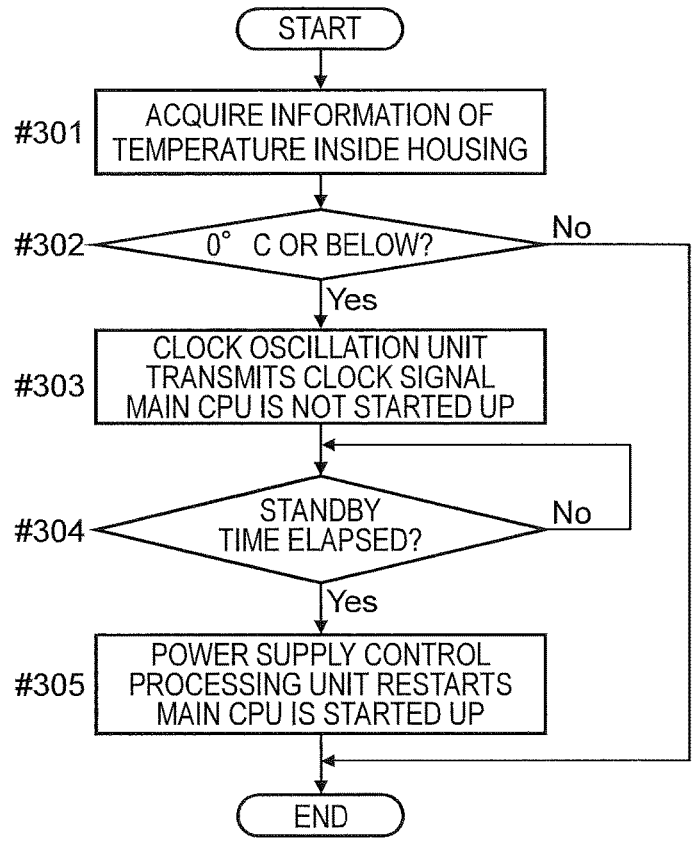
FIG. 6 is a flowchart showing an example of operation processing performed in a warming-up operation mode of an image forming apparatus according to a third embodiment of the present invention.
Figure 7:
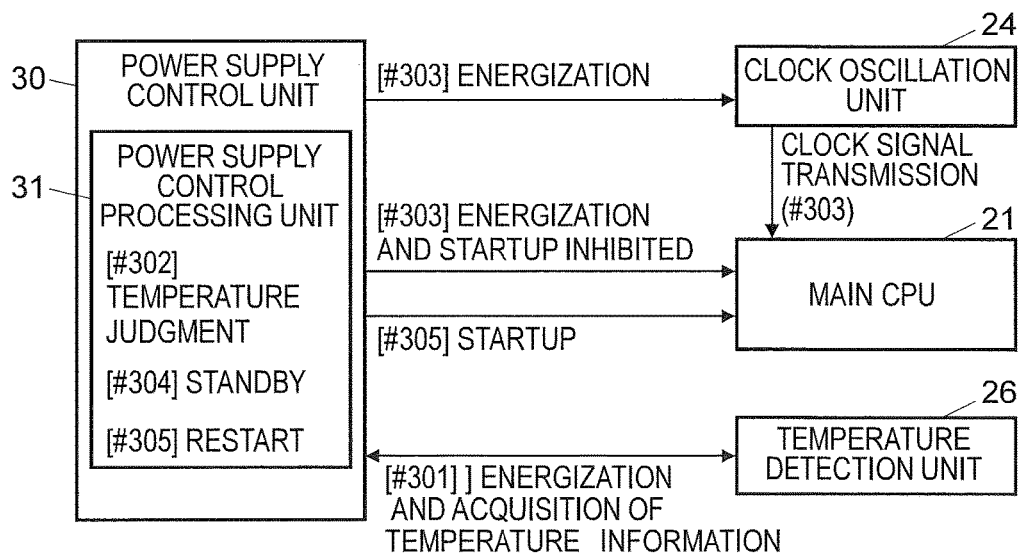
FIG. 7 is a block diagram for illustrating the operation processing performed in the warming-up operation mode of the image forming apparatus according to the third embodiment of the present invention.

Third Embodiment: Next, a description will be given of an image forming apparatus according to a third embodiment of the present invention with reference to FIGS. 6 and 7. FIGS. 6 and 7 are respectively a flowchart showing an example of operation processing performed in a warming-up operation mode of the image forming apparatus and a block diagram for illustrating the operation processing performed in the warming-up operation mode of the image forming apparatus. The configuration in this embodiment is basically the same as the configuration in the first embodiment discussed above; accordingly, such constituent elements as are found also in the first embodiment are identified by common reference signs or part names, and overlapping descriptions thereof will occasionally be omitted.

When the image forming apparatus 1 of the third embodiment starts to operate in the warming-up operation mode (START in FIG. 6), the power supply control processing unit 31 starts up to start energization of the temperature detection unit 26 at step #301, and acquires information of temperature inside the housing of the image forming apparatus 1 from the temperature detection unit 26 (see FIG. 7).

At step #302, the power supply control processing unit 31 judges whether the temperature inside the housing of the image forming apparatus 1 is equal to or below 0° C., which is a predetermined temperature set beforehand. This predetermined temperature, as mentioned above, is set in consideration of the recommended operation temperature of the main CPU 21 (for example, 0° C.), and information of the temperature is stored in the storage 23 in advance. In a case where the temperature inside the housing is above 0° C., the operation processing in the warming-up operation mode is finished (END in FIG. 6), and ordinary startup processing is executed. In a case where the temperature inside the housing is equal to or below 0° C., the process proceeds to step #303.

At step #303, the power supply control processing unit 31 starts up to start energization of each of the constituent elements, and the power supply control processing unit 31 makes the clock oscillation unit 24 start operating to transmit a clock signal to the main CPU 21, but the power supply control processing unit 31 does not start up the main CPU 21. The clock oscillation unit 24 transmits the clock signal to the constituent elements including the main CPU 21 (see FIG. 7).

At step #304, the power supply control processing unit 31 judges whether a predetermined standby time set beforehand has elapsed. In a case where the standby time has not elapsed yet, the judgment at step #304 is repeatedly made until the standby time elapses. In a case where the standby time has elapsed, the process proceeds to step #305.

At step #305, the power supply control processing unit 31 restarts itself and starts up the main CPU 21. Then, the operation processing in the warming-up operation mode is finished (END in FIG. 6).

Figure 8:
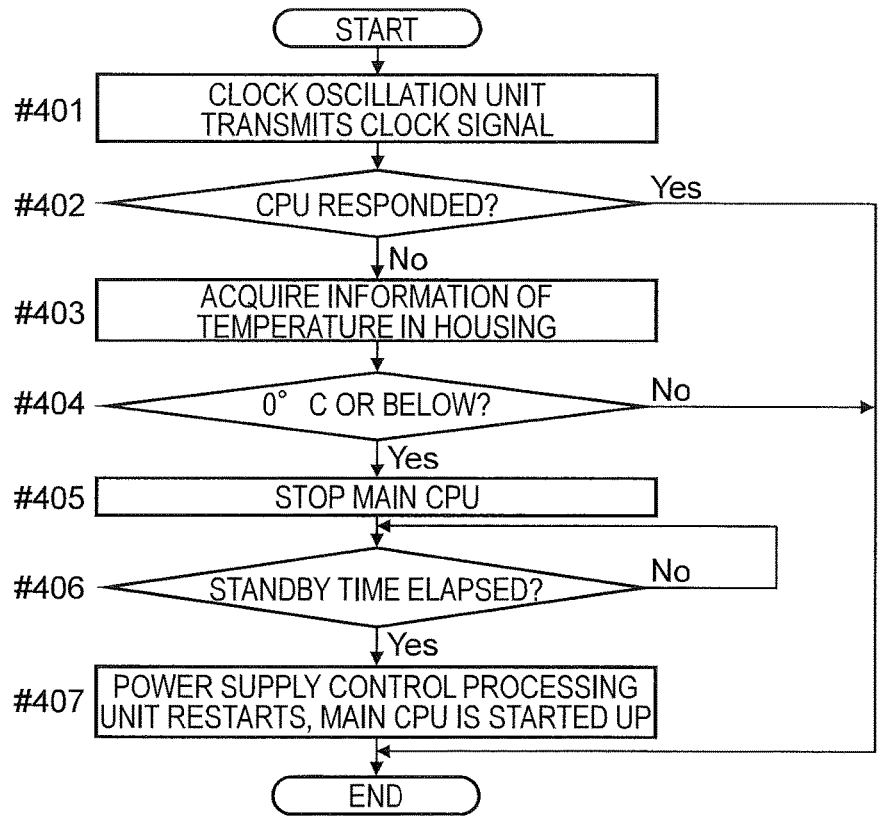
FIG. 8 is a flowchart showing an example of operation processing performed in a warming-up operation mode of an image forming apparatus according to a fourth embodiment of the present invention.
Figure 9:
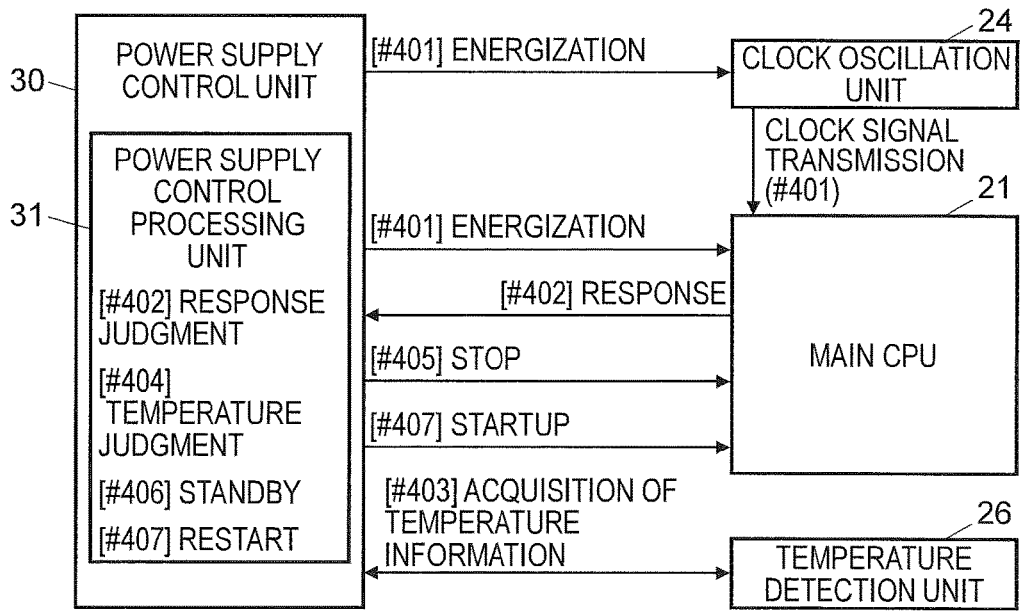
FIG. 9 is a block diagram for illustrating the operation processing performed in the warming-up operation mode of the image forming apparatus according to the fourth embodiment of the present invention.

Fourth Embodiment: Next, a description will be given of an image forming apparatus according to a fourth embodiment of the present invention with reference to FIGS. 8 and 9. FIGS. 8 and 9 are respectively a flowchart showing an example of operation processing performed in a warming-up operation mode of the image forming apparatus and a block diagram for illustrating the operation processing performed in the warming-up operation mode of the image forming apparatus. The configuration in this embodiment is basically the same as the configuration in the first embodiment discussed above; accordingly, such constituent elements as are found also in the first embodiment are identified by common reference signs or part names, and overlapping descriptions thereof will occasionally be omitted.

When the image forming apparatus 1 of the fourth embodiment starts to operate in the warming-up operation mode (START in FIG. 8), the power supply control processing unit 31 starts up to start energization of each of the constituent elements at step #401 and make the clock oscillation unit 24 start operating to transmit a clock signal to the main CPU 21. The clock oscillation unit 24 transmits the clock signal to the constituent elements including the main CPU 21 (see FIG. 9). Here, an attempt is made to start up the main CPU 21.

At step #402, the power supply control processing unit 31 judges whether a response is being received from the main CPU 21. In a case where a response is being received from the main CPU 21, the operation processing in the warming-up operation mode is finished (END in FIG. 8), and ordinary startup processing is executed. In a case where no response is being received from the main CPU 21, the process proceeds to step #403.

At step #403, the power supply control processing unit 31 acquires information of temperature inside the housing of the image forming apparatus 1 from the temperature detection unit 26 (see FIG. 9).

At step #404, the power supply control processing unit 31 judges whether the temperature inside the housing of the image forming apparatus 1 is equal to or below 0° C., which is a predetermined temperature set beforehand. In a case where the temperature inside the housing is above 0° C., the operation processing in the warming-up operation mode is finished (END in FIG. 8), and ordinary startup processing is executed. In a case where the temperature inside the housing is equal to or below 0° C., the process proceeds to step #405.

At step #405, the power supply control processing unit 31 stops the main CPU 21.

At step #406, the power supply control processing unit 31 judges whether a predetermined standby time set beforehand has elapsed. In a case where the standby time has not elapsed yet, the judgment at step #406 is repeatedly made until the standby time elapses. In a case where the standby time has elapsed, the process proceeds to step #407.

At step #407, the power supply control processing unit 31 restarts itself and starts up the main CPU 21. Then, the operation processing in the warming-up operation mode is finished (END in FIG. 8).

Figure 10:
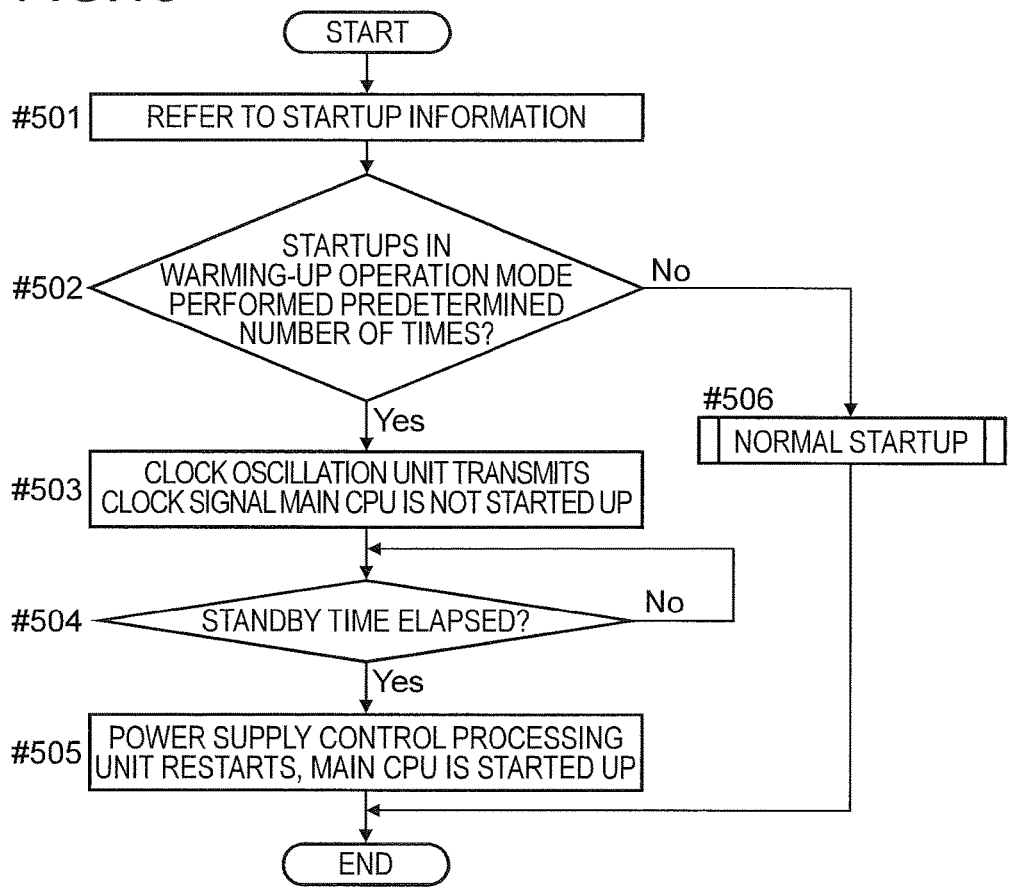
FIG. 10 is a flowchart showing an example of operation processing performed in a warming-up operation mode of an image forming apparatus according to a fifth embodiment of the present invention.
Figure 11:
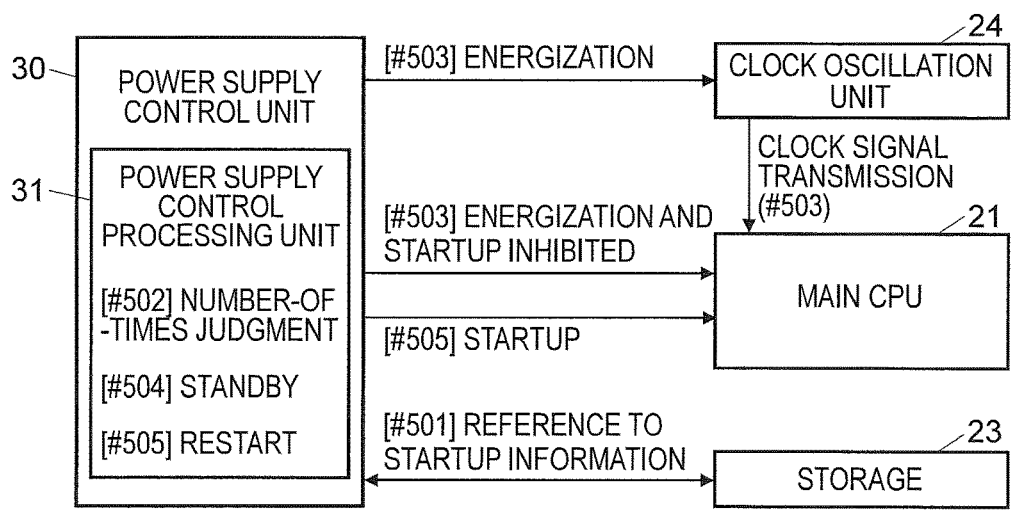
FIG. 11 is a block diagram for illustrating the operation processing performed in the warming-up operation mode of the image forming apparatus according to the fifth embodiment of the present invention.

Fifth Embodiment: Next, a description will be given of an image forming apparatus according to a fifth embodiment of the present invention with reference to FIGS. 10 and 11. FIGS. 10 and 11 are respectively a flowchart showing an example of operation processing performed in a warming-up operation mode of the image forming apparatus and a block diagram for illustrating the operation processing performed in the warming-up operation mode of the image forming apparatus. The configuration in this embodiment is basically the same as the configuration in the first embodiment discussed above; accordingly, such constituent elements as are found also in the first embodiment are identified by common reference signs or part names, and overlapping descriptions thereof will occasionally be omitted.

When the image forming apparatus 1 of the fifth embodiment starts to operate in the warming-up operation mode (START in FIG. 10), the power supply control processing unit 31 starts up at step #501 and accesses the storage 23 to refer to startup information (see FIG. 11).

Here, in a case of starting up in the warming-up operation mode, the main CPU 21 makes the storage 23 store warming-up mode startup information. This startup information is cumulatively stored in a nonvolatile memory of the storage 23. When the warming-up operation mode startup information is not needed, it can be deleted manually via the operation panel 5, or automatically by previously setting a predetermined term of validity for the startup information. The term of validity for the startup information can be set via the operation panel 5, as necessary, in accordance with a length of each of the four seasons, at turns of the seasons (every three months), for example. In the case where the automatic deletion of the startup information has been set, the main CPU 21 refers to an unillustrated real time clock (RTC), and automatically deletes the startup information after a lapse of the term of validity.

At step #502, the power supply control processing unit 31 judges, based on the startup information of previous operations executed in the warming-up operation mode, whether the number of times of startups performed in the warming-up operation mode in a predetermined previous period of time set beforehand has reached a predetermined number of times set beforehand. This judgment covers both a case where the predetermined number of times of startups have occurred in the warming-up operation mode in a row in the predetermined previous period of time and a case where the predetermined number of times of startups have occurred in the warming-up operation mode intermittently in the predetermined previous period of time. In a case where the number of times of startups has reached the predetermined number of times, the process proceeds to step #503. In a case where the number of times of startups has not reached the predetermined number of times, the process proceeds to step #506.

At step #503, the power supply control processing unit 31 starts up to start energization of the constituent elements, and the power supply control processing unit 31 makes the clock oscillation unit 24 start operating to transmit a clock signal to the main CPU 21, but the power supply control processing unit 31 does not start up the main CPU 21. The clock oscillation unit 24 transmits the clock signal to the constituent elements including the main CPU 21 (see FIG. 11).

At step #504, the power supply control processing unit 31 judges whether a predetermined standby time set beforehand has elapsed. In a case where the standby time has not elapsed yet, the judgment at step #504 is repeatedly made until the standby time elapses. In a case where the standby time has elapsed, the process proceeds to step #505.

At step #505, the power supply control processing unit 31 restarts itself and starts up the main CPU 21. Then, the operation processing in the warming-up operation mode performed for a case where startups in the warming-up mode have recently occurred frequently is finished (END in FIG. 10).

At step #506, normal startup processing in the warming-up operation mode is executed. The normal startup processing in the warming-up operation mode includes the processing in the warming-up operation mode described in each of the second to fourth embodiments. Then, the operation processing in the warming-up operation mode performed for the case where startups in the warming-up mode have recently occurred frequently is finished (END in FIG. 10).

According to an embodiment described above, an image forming apparatus 1 includes a main CPU 21 as a function control processing unit, a clock oscillation unit 24, a power supply control unit 30, and a power supply control processing unit 31. The main CPU 21 executes processing related to a function of the image forming apparatus 1 by controlling operations of constituent elements provided in the image forming apparatus 1. The clock oscillation unit 24 transmits a clock signal to the constituent elements including the main CPU 21. The power supply control unit 30 supplies power to the constituent elements. The power supply control processing unit 31 is provided in the power supply control unit 30, and starts up when the power supply to the image forming apparatus 1 is turned on, and controls energization of the constituent elements and an operation of the main CPU 21 at the time of startup. Further, the image forming apparatus 1 has a warming-up operation mode in which when the power supply to the image forming apparatus 1 is turned on, the power supply control processing unit 31 starts up to make the clock oscillation unit 24 start operating to transmit the clock signal to the main CPU 21, and after a lapse of a predetermined standby time set beforehand, with the main CPU 21 kept inactive, the power supply control processing unit 31 restarts itself and starts up the main CPU 21.

With this configuration, the clock oscillation unit 24 starts operating when the power supply to the image forming apparatus 1 is turned on, and starts transmitting the clock signal to the main CPU 21. The clock oscillation unit 24 continues to transmit the clock signal to the main CPU 21 all through a predetermined standby time during which the main CPU 21 is not started. Thereby, the main CPU 21 is made to continuously receive the clock signal, and this makes it possible to raise the temperature of the main CPU 21. This helps prevent malfunction of the image forming apparatus 1 attributable to a start-up environment temperature that is lower than a recommended operation temperature, and thus contributes to improvement in reliability and safety.

According to another embodiment described above, an image forming apparatus 1 has a warming-up operation mode in which when the power supply to the image forming apparatus 1 is turned on, the power supply control processing unit 31 starts up to make the clock oscillation unit 24 start operating to transmit a clock signal to the main CPU 21, and the power supply control processing unit 31 judges whether a response is being received from the main CPU 21, the power supply control processing unit 31 making the main CPU 21 stop operating in a case where no response is being received from the main CPU 21, and after a lapse of a predetermined standby time set beforehand, the power supply control processing unit 31 restarts itself and starts up the main CPU 21.

With this configuration, after the power supply to the image forming apparatus 1 is turned on, before selling the predetermined standby time for the temperature of the main CPU 21 to rise by receiving the clock signal, it is possible to judge whether the main CPU 21 has normally started up. Thereby, it becomes possible to start up the main CPU 21 in a normal manner when the environment allows the normal starting up of the main CPU 21, and this makes it possible to prevent the standby time from being set all the time. Thus, it is possible to start up the image forming apparatus 1 in a preferable manner.

According to another embodiment described above, an image forming apparatus 1 includes a temperature detection unit 26 for detecting a temperature inside the image forming apparatus 1, and, in a warming-up operation mode, when the power supply to the image forming apparatus 1 is turned on, the power supply control processing unit 31 starts up, and in a case where, based on temperature information acquired from the temperature detection unit 26, the temperature inside image forming apparatus 1 is equal to or below a predetermined temperature set beforehand, the power supply control processing unit 31 makes the clock oscillation unit 24 start operating to transmit a clock signal to the main CPU 21, and after a lapse of a predetermined standby time set beforehand, with the main CPU 21 kept inactive, the power supply control processing unit 31 restarts itself and starts up the main CPU 21.

With this configuration, it is possible to normally start up the main CPU 21 in a case where the temperature inside the apparatus acquired immediately after the power supply to the image forming apparatus 1 is turned on is above a recommended operation temperature (for example, 0° C.) for the main CPU 21, which is a predetermined temperature. Thereby, it is possible to prevent the standby time from being set all the time, and thus to start up the image forming apparatus 1 in a preferable manner.

According to another embodiment described above, the image forming apparatus 1 includes the temperature detection unit 26 for detecting a temperature inside the image forming apparatus 1, and, in a warming-up operation mode, when the power supply to the image forming apparatus 1 is turned on, the power supply control processing unit 31 starts up to make the clock oscillation unit 24 start operating to transmit a clock signal to the main CPU 21, and the power supply control processing unit 31 judges whether a response is being received from the main CPU 21. In a case where no response is being received from the main CPU 21, if, based on temperature information acquired from the temperature detection unit 26, the temperature inside the image forming apparatus 1 is equal to or below a predetermined temperature set beforehand, the power supply control processing unit 31 makes the main CPU 21 stop operating, and after a lapse of a predetermined standby time set beforehand, the power supply control processing unit 31 restarts itself and starts up the main CPU 21.

With this configuration, it is possible to judge, before setting the predetermined standby time for raising the temperature of the main CPU 21 after the power supply to the image forming apparatus 1 is turned on, whether the main CPU 21 has normally started up, and further, whether the temperature inside the apparatus is above a recommended operation temperature (for example, 0° C.) for the main CPU 21. Thereby, it is possible to detect a situation where the main CPU 21 is not operating normally despite that the temperature inside the apparatus is above the recommended operation temperature for the main CPU 21. This accordingly makes it possible to start up the image forming apparatus 1 in a preferable manner, and further, to also detect other defective conditions besides a startup environment temperature for the image forming apparatus 1 that is below the recommended operation temperature.

In this case, the user may be notified to the effect that the main CPU 21 has not started up in a normal manner. The notification may be made, for example, by displaying a message such as "The main CPU 21 is likely to be malfunctioning" on the display unit 5w of the operation panel 5, by displaying such a message with an error lamp on, or issuing an alarm sound or voice notification.

According to another embodiment, the image forming apparatus 1 further includes a storage 23. Here, in a case of startup in the warming-up operation mode, the main CPU 21 makes the storage 23 store information of the startup in the warming-up operation mode, and when the power supply to the image forming apparatus 1 is turned on, the power supply control processing unit 31 starts up to refer to the startup information, the power supply control processing unit 31 making the clock oscillation unit 24 start operating to transmit a clock signal to the main CPU 21 in a case where the number of times of startups in the warming-up operation mode performed in a predetermined previous period of time set beforehand has reached a predetermined number of times set beforehand, and after a lapse of a predetermined standby time set beforehand, with the main CPU kept inactive, the power supply control processing unit 31 restarts itself and starts up the main CPU 21.

With this configuration, reference can be made to statuses of previous startups of the image forming apparatus, and in a case where startups have recently been frequently performed in the warming-up operation mode, it is judged that the image forming apparatus 1 is under an environment of a temperature that is low for the current season, and this situation can be dealt with. Thereby, the predetermined standby time for raising the temperature of the main CPU 21 is set immediately after the power supply to the image forming apparatus 1 is turned on, and it is possible to quickly execute the operation processing in the warming-up operation mode. This allows an efficient startup of the image forming apparatus 1.

Embodiments of the present invention have been described above, but the scope of the present invention is not limited to the embodiments, and the present invention can be implemented in variously modified forms within the spirit of the invention.

For example, the above descriptions of embodiments have dealt with cases where the main CPU 21 of the main control unit 20 is the function control processing unit as the target of the startup operation control by the power supply control processing unit, but the function control processing unit is not limited to the main CPU 21, and the target may instead be ASIC adopted in the image processing unit 22 and the like, or an engine CPU used in the printing unit 6, for example.

The numerical values presented in the above descriptions of the embodiments as the recommended operation temperature, the standby time for raising the temperature of the main CPU 21, the term of validity of startup information in a warming-up mode, for example, are just examples, and they can be set to different values.

INDUSTRIAL APPLICABILITY

The present invention is usable in image forming apparatuses.

The invention claimed is:

1. An image forming apparatus comprising:
a function control processing unit which controls operations of constituent elements provided in the image forming apparatus and executes processing related to a function of the image forming apparatus;
a clock oscillation unit which transmits a clock signal to the constituent elements including the function control processing unit;
a power supply control unit for supplying power to the constituent elements; and
a power supply control processing unit which
is provided in the power supply control unit,
starts up when power supply to the image forming apparatus is turned on,
controls energization of the constituent elements, and
controls an operation of the function control processing unit at a time of startup,
wherein
the image forming apparatus has a warming-up operation mode in which when the power supply to the image forming apparatus is turned on, the power supply control processing unit starts up to make the clock oscillation unit start operating to transmit the clock signal to the function control processing unit, and the power supply control processing unit judges whether a response is being received from the function control processing unit, the power supply control processing unit making the function control processing unit stop operating in a case where no response is being received from the function control processing unit, and after a lapse of a predetermined standby time set beforehand, the power supply control processing unit restarts itself and starts up the function control processing unit.

2. The image forming apparatus according to claim 1, further comprising a temperature detection unit for detecting a temperature inside the image forming apparatus,
wherein
in the warming-up operation mode, when the power supply to the image forming apparatus is turned on, the power supply control processing unit starts up to make the clock oscillation unit start operating to transmit the clock signal to the function control processing unit, and
the power supply control processing unit judges whether a response is being received from the function control processing unit, the power supply control processing unit making the function control processing unit stop operating if, based on temperature information acquired from the temperature detection unit, the temperature inside the image forming apparatus is equal to or below a predetermined temperature set beforehand, in a case where no response is being received from the function control processing unit, and after a lapse of the predetermined standby time set beforehand, the power supply control processing unit restarts itself and starts up the function control processing unit.

3. The image forming apparatus according to claim 1, further comprising a storage,
wherein
in a startup in the warming-up operation mode,
the function control processing unit makes the storage store information of the startup in the warming-up operation mode, and,
when the power supply to the image forming apparatus is turned on, the power supply control processing unit starts up to refer to the startup information, and in a case where a number of times of startups in the warming-up operation mode performed in a predetermined previous period of time set beforehand has reached a predetermined number of times set beforehand, the power supply control processing unit makes the clock oscillation unit start operating to transmit the clock signal to the function control processing unit, and after a lapse of the predetermined standby time set beforehand, with the function control processing unit kept inactive, the power supply control processing unit restarts itself and starts up the function control processing unit.

4. The image forming apparatus according to claim 2, further comprising a storage,
wherein
in a startup in the warming-up operation mode,
the function control processing unit makes the storage store information of the startup in the warming-up operation mode, and,
when the power supply to the image forming apparatus is turned on, the power supply control processing unit starts up to refer to the startup information, and in a case where a number of times of startups in the warming-up operation mode performed in a predetermined previous period of time set beforehand has reached a predetermined number of times set beforehand, the power supply control processing unit makes the clock oscillation unit start operating to transmit the clock signal to the function control processing unit, and after a lapse of the predetermined standby time set beforehand, with the function control processing unit kept inactive, the power supply control processing unit restarts itself and starts up the function control processing unit.

* * * * *